United States Patent [19]

Scherer et al.

[11] 3,824,802

[45] July 23, 1974

[54] CONTROL MEANS FOR ACCUMULATOR THROTTLING DEVICE

[75] Inventors: Carl A. Scherer, Clarence Center; Gary E. Richards, Lockport, both of N.Y.

[73] Assignee: General Motors Corporation, Detroit, Mich.

[22] Filed: July 11, 1973

[21] Appl. No.: 378,229

[52] U.S. Cl. .................... 62/217, 62/471, 62/474, 62/503
[51] Int. Cl. ............................................ F25b 41/04
[58] Field of Search ............ 62/217, 503, 470, 471, 62/474

[56] References Cited
UNITED STATES PATENTS

| | | | |
|---|---|---|---|
| 2,071,935 | 2/1937 | Muffly | 62/217 |
| 3,525,234 | 8/1970 | Widdowson | 62/217 |
| 3,609,990 | 10/1971 | Bottom | 62/503 |

*Primary Examiner*—Meyer Perlin
*Attorney, Agent, or Firm*—K. H. MacLean, Jr.

[57] ABSTRACT

An improved evaporator temperature controller for use in an air conditioning system having a refrigerant compressor and an evaporator in series flow relationship to one another and including a liquid accumulator housing therebetween enclosing an interior space and having an inlet connected to the evaporator and an outlet connected to the compressor. A valve seat member is supported within the interior space with a valve passage therethrough separating the outlet portion of the housing from the interior space. A water filled freeze actuator is located in said interior space in good heat transfer relation to refrigerant therein and is operably connected to a throttling valve member to control refrigerant flow therefrom in accord with the 32° F freeze — expansion characteristics of the actuator. An oil pick-up tube which is in bypass relation to the throttling valve supplies the compressor with lubricating oil when the throttling valve is in a closed position and is placed in good heat transfer with the actuator to transfer heat from the actuator whenever the throttling valve is in a closed position whereby improved control of the evaporator temperature is achieved.

4 Claims, 4 Drawing Figures

PATENTED JUL 23 1974

3,824,802

CONTROL TEMPERATURE WITH AND WITHOUT OIL PICK-UP TUBE/ACTUATOR HEAT EXCHANGE, CONSTANT SPEED, NO OIL, AT VARIOUS AMBIENTS

CONTROL MEANS FOR ACCUMULATOR THROTTLING DEVICE

This invention relates to an improved evaporator temperature controller particularly adapted for use in an automobile air conditioning system.

In present automobile air conditioning systems, the refrigerant compressor is rotated by the automobile's external combustion engine whose speed varies over a relatively wide range. The compressing capacity of the compressor is proportional to these changes in the engine speed and this variable capacity directly affects the cooling effectiveness of the system since the capacity of the evaporator to cool air at various ambient temperatures is limited by heat transfer considerations primarily tied to fin design.

Unfortunately, changes in compressor speed are not capable of being conveniently or economically regulated to correspond to the evaporator cooling capacity. Thus, during operation under low ambient temperatures, the compressing capacity usually greatly exceeds the cooling capacity of the evaporator to extract heat from the air passing over its exterior surfaces. Resultantly, refrigerant pressure within the evaporator will decrease due to the excess or buildup of liquid refrigerant supplied and its incomplete vaporization in the evaporator. In addition, the rate of refrigerant discharge of the evaporator to the compressor during high speed operation of the compressor is great and will readily decrease evaporator pressure.

Refrigerant pressure eventually decreases below a pressure level corresponding to a freezing temperature on the exterior finned surfaces of the evaporator. When these finned surfaces drop below 32° F, frost usually begins to accumulate thereon. The frost accumulation is very undesirable because it decreases the rate of heat transfer between air and the evaporator structure and may eventually block air flow through the evaporator entirely.

Therefore, it is desirable to provide means to prevent the refrigerant temperature within the evaporator from falling below levels corresponding to freezing temperatures on the exterior of the evaporator. The present illustrated air conditioning system includes an improved temperature responsive throttling valve which is located in a refrigerant accumulator between the evaporator and the compressor. Under the aforedescribed low ambient conditions and resultant excess compressor capacity over evaporator cooling capacity, the throttling valve moves toward a closed position to restrict the flow of refrigerant from the evaporator to the compressor. This restriction or throttling tends to maintain sufficient refrigerant in the evaporator to vaporize refrigerant therein sufficiently to maintain evaporator pressure above a level corresponding to temperatures above 32° F.

Previously, throttling valves have been utilized containing evacuated bellow type sensors which respond to changes in evaporator pressure to position a throttling valve which controls the pressure in the evaporator. Other systems have even used external sensors or feelers cooperative with the evaporator's exterior which will sense frost buildup to activate de-frost means such as a compressor cut-off switch.

The present evaporator temperature controller consists of a throttling valve conveniently housed within the interior of an accumulator which is connected between the evaporator and the compressor. The throttling valve regulates the flow of refrigerant from the evaporator to the compressor by movement produced by extension of a water filled actuator located upstream from the valve member and responsive to freezing temperatures of refrigerant. The water filled actuator is extended by the expansion of ice and moves the throttling valve toward a more closed position. This tends to maintain evaporator pressure above the level needed to prevent frost accumulation on the evaporator's external surfaces.

The illustrated throttling valve assembly is conveniently housed within a liquid accumulator. The liquid accumulator stores an excess of refrigerant which will make up for small leakages of refrigerant over a period of time. The arrangement of the inlet and the outlet of the accumulator causes separation of vapor and liquid refrigerant so that mostly vaporous refrigerant rises and passes to the compressor through the outlet. The trapped liquid refrigerant in the bottom is eventually vaporized and also passes to the compressor. The throttling valve is attached to a tubular portion of the valve actuator which is located upstream from the throttling valve.

The illustrated embodiment of the valve actuator includes an elongated tubular member filled with an aqueous mixture having a freeze temperature of about 32° F. For use with certain types of evaporators which freeze at a lower temperature than 32° F, a mixture of alcohol and water may be used. A hollow bellows portion having corrugated, thin walled sides is connected to the tubular portion with its interior fluidly connected to the interior of the tubular portion. The bellows contains a fluid, such as oil, which is immiscible with respect to water and solidifies substantially below 32° F. When the water freezes in response to low refrigerant temperatures in the accumulator, it expands to pressurize the adjacent oil-filled bellows portion. This causes the bellows to extend axially and move the operably connected throttling valve.

The upstream location of the water-filled freeze portion of the actuator permits the throttling valve to respond to refrigerant temperatures of the evaporator (as directly transmitted to the accumulator.) A location of the tubular portion downstream from the valve would often incorrectly sense evaporator temperature since refrigerant temperature downstream is quickly decreased by closing of the throttling valve. The refrigerant temperature downstream is frequently sub-freezing due to the low pressure conditions.

The air conditioning compressor is lubricated by a quantity of oil which is mixed with and carried by the refrigerant through the system. The oil has a tendency to collect in places like the bottom of the accumulator. To maintain a flow of oil to the compressor for lubrication when the throttling valve is closed, a bypass means must be provided around the throttling valve. For this purpose, an oil pick-up tube extends from the bottom of the accumulator upward and in bypass relation to the throttling valve. A small orifice at the outlet of the oil pick-up tube controls the flow of refrigerant and oil in bypass to the throttling valve.

When the throttling valve is near a closed position, the pressure in the suction line is reduced compared to the pressure within the accumulator. This pressure gradient draws the oil pick-up tube and discharges it into the suction line.

The evaporator temperature is controlled by freeze characteristics of the water-filled actuator with a freeze temperature of about 32° F. Because there is a temperature gradient between the refrigerant conducting tube portions of the evaporator and its finned surfaces, the refrigerant temperature may decrease somewhat below 32° F, without frost accumulating on the warmer exterior finned surfaces. This is particularly true under high ambient temperature operation. The tubular portion of the actuator which is filled with water can control by expansion only at its freeze temperature of about 32° F. The normal operation of the throttling valve as the refrigerant temperature in the accumulator begins to decrease below 32° F is to move toward a closed position. The fluid in the actuator's tubular portion responds to the decreasing refrigerant temperature by forming ice crystals within the tubular portion. The resultant volumetric expansion pressurizes the bellows portion of the actuator and causes it to move axially with respect to the tubular portion. The connected throttling valve is moved by the extension of the actuator to restrict refrigerant flow. This has the effect of increasing the pressure and temperature within the evaporator in correspondence with known pressure-temperature characteristics of refrigerants. The increased refrigerant temperature is rapidly passed on to the fluid within the actuator to cause some ice to melt and the throttling valve to adjust toward a more open position.

The present evaporator temperature controller is an improvement over the system as described above which is the subject of a co-pending patent application entitled "Air Conditioning System with Freeze Throttling Valve" by C. A. Scherer and H. J. Muirhead. In the present controller, the oil pick-up tube is attached at its inlet end to the tubular portion of the actuator in good heat transfer relation thereto. The oil pick-up tube extends upward from the bottom of the actuator to an upper outlet end which is located downstream from the throttling valve. A small orifice is located at the lower inlet end of the oil pick-up tube to control the flow of refrigerant and oil through the tube and to effect the pressure and temperature within the tube.

Under high ambient temperature conditions, the throttling valve is usually positioned toward a more open position. Because the throttling valve is open, it does not greatly restrict refrigerant flow and the difference in refrigerant pressure upstream and downstream from the throttling valve is small. As a result, only small quantities of refrigerant and oil are drawn through the pick-up tube. Consequently, the pressure and temperature of the fluid in the pick-up tube is substantially the same as the refrigerant pressure and temperature in the accumulator and the heat transfer between the fluid in the pick-up tube and the actuator has little affect upon freezing and thawing of ice in the actuator. As a result then, under the high ambient temperature conditions, the actuator will control refrigerant temperature within the actuator and evaporator at or very near the solutions freezing temperature. This is desirable because maximum cooling is required under these conditions and there is little chance of frost accumulation on the evaporator due to the higher temperature of air passing therethrough.

During low ambient temperature operation of the system, the throttling valve must be positioned toward a closed position to prevent evaporator refrigerant temperature from decreasing below a freezing level. The restriction of refrigerant flow produces a significant pressure gradient between points upstream and downstream of the throttling valve. This increases the flow of refrigerant and oil through the pick-up tube and decreases the pressure within the pick-up tube. The decrease in refrigerant pressure in the pick-up tube lowers the fluids temperature therein and thus readily absorbs heat from the actuator's tubular portion. Since the solution within the tubular portion of the actuator has a fixed freezing temperature of about 32° F, the supplemental heat transfer to the pick-up tube decreases the heat transfer from the refrigerant surrounding the actuator. Thus, although the water in the actuator always controls at about 32° F, the refrigerant temperature in the accumulator and evaporator is permitted to increase due to the supplemental cooling by the pick-up tube. This is desirable because under low ambient temperature conditions, the evaporator is more prone to accumulate frost than under high ambient temperature conditions. The increased refrigerant temperature in the evaporator corresponding to closing of the throttling valve effectively prevents frost from forming.

The aforedescribed operation of the accumulator with heat transfer from the oil pick-up tube provides the means for producing effective evaporator temperature. Even if the solution in the actuator has a lower freezing temperature below 32° F because of impurities, it may be used without frost forming on the evaporator. Under low ambient temperature operation of the system, the more closed throttling valve will decrease the temperature of refrigerant in the pick-up tube and supply the aforementioned supplemental heat transfer which effectively causes the refrigerant temperature in the accumulator and evaporator to increase above a freezing level. However, under high ambient temperature operation of the system, the relatively open throttling valve decreases the flow of refrigerant through the pick-up tube and greatly decreases supplemental heat transfer to the actuator. This allows the temperature of refrigerant in the accumulator and evaporator to fall to about 32° F which is sufficient to insure against frost formation under high ambient operation.

Therefore, an object of the present invention is to provide an improved and highly accurate evaporator temperature controller for air conditioning systems of the freeze actuated type which effectively prevents frost accumulation on an evaporator during operation of the system over a wide range of ambient temperatures.

A further object of the present invention is to provide an improved evaporator temperature controller of the freeze actuated type containing a fluid having a freeze temperature of about 32° F for controlling a throttling valve and which is exposed to a source of supplemental heat transfer in the form of oil pick-up tubes attached to the actuator and extending between upstream and downstream locations with respect to the throttling valve to provide flow of refrigerant and oil to a refrigerant compressor when the throttling valve moves toward a closed position.

A still further object of the present invention is to provide an improved evaporator temperature controller of the freeze actuated type utilizing a fluid which freezes at about 32° F enclosed in an actuator exposed to heat transfer from evaporator refrigerant and to heat transfer from an attached oil pick-up tube extending in bypass relation to the throttling valve of the controller and having an orifice near its inlet to provide a low pressure and low temperature fluid filled heat sink for the actuator when the throttling valve is toward a closed operative position.

Further objects and advantages of the present invention will be readily apparent from the following detailed description, reference being had to the accompanying drawings in which a preferred embodiment is clearly shown.

In the Drawings

Figure 1:
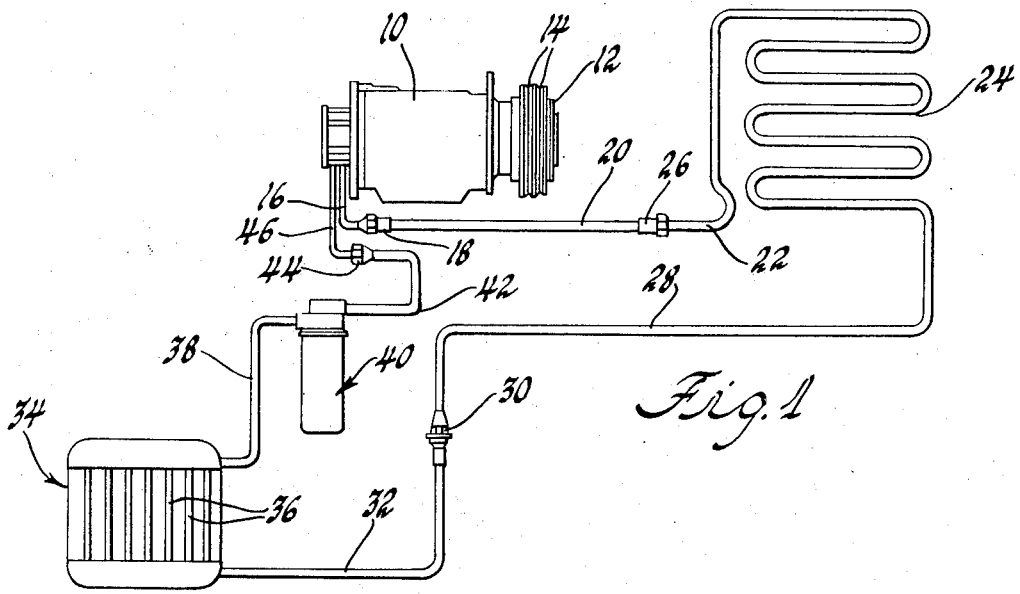
FIG. 1 is a schematic illustration of an automobile air conditioning system including the present invention as described hereafter.

An air conditioning system is illustrated in FIG. 1 including a refrigerant compressor 10. The drive shaft of compressor 10 is attached to a pulley assembly 12 which is intended to be connected to an automobile engine by belts (not shown) which would extend through grooves 14 of the pulley 12. The outlet 16 of compressor 10 is connected by a fitting 18 to a flexible hose 20 which in turn is connected to the inlet 22 of condenser 24 by a fitting 26. The condenser 24 is normally located near the front of the automobile to be exposed to air flow through the automobile grille for cooling and liquifying warm refrigerant therein. The outlet 28 of condenser 24 is fluidly connected to a capillary type expander 30 to reduce the pressure of liquid refrigerant received from condenser 24. For more details of the capillary expander shown in FIG. 1, reference is made to a co-pending U.S. Pat. application Ser. No. 302,108, filed Oct. 30, 1972, and assigned to General Motors Corporation.

The expander 30 is connected to the inlet 32 of an evaporator 34 in which liquid refrigerant is vaporized in parallel vertical tubes 36, each having vertical fluid conveying portions with connected fin surfaces formed integrally therewith. The evaporator 34 has an outlet 38 which is connected to the inlet of a liquid accumulator 40. The liquid accumulator 40 separates liquid from vaporous refrigerant and discharges mostly vaporous refrigerant through an upper outlet into a suction line 42. Suction line 42 is connected by a fitting 44 to the inlet 46 of compressor 10.

As previously mentioned, when the air conditioning system is operated under relatively low ambient temperature conditions, there is frequently insufficient heat transferred from the air flowing through evaporator 34 to vaporize the quantity of refrigerant compressed. Resultantly, the evaporator's internal pressure decreases below the level corresponding to freezing temperatures. The present invention provides a thermally responsive throttling valve assembly 48 within the accumulator 40 to restrict the flow of refrigerant from the evaporator under these low ambient temperature conditions and to consequently increase the internal pressure in the evaporator and prevent low temperature levels.

The accumulator 40 includes an elongated tubular member 50 having a closed bottom end 52 and defining an interior space 54. The open upper end of the tubular member 50 is covered by an end member 56. Radially outwardly extending flange portions 57 and 58 on the ends of members 50 and 56 are joined together by a number of fasteners 59 (one of which is shown). An O-ring 60 prevents refrigerant leakage between the members 50 and 56. Member 56 has an inlet fitting 62 adapted to be fluidly connected to the evaporator outlet 38. Likewise, an outlet fitting 64 in member 56 is adapted to be fluidly connected to the suction line 42 shown in FIG. 1. An inlet passage 66 in fitting 62 introduces a mixture of liquid and vaporous refrigerant from the evaporator into the interior of members 50 and 56. Refrigerant is discharged from the accumulator interior through an outlet passage 70 in fitting 64. An annular dessicant assembly 72 is supported in the bottom of interior space 54 by members 74, 75. The dessicant assembly 72 itself includes a container 76 of porous material enclosing a quantity of silica gel 78. The silica gel effectively absorbs any moisture which happens to be mixed with the refrigerant.

The refrigerant temperature in the evaporator and the accumulator are controlled by the positioning of throttling valve assembly 48 which is supported in the space 54 by an annular valve seat member 80. Member 80 is pressed into the end of member 50 but includes ports 82 (one shown) which allow refrigerant to flow from inlet passage 66 to the lower portion of interior space 54 defined by member 50. Centrally located through the valve seat member 80 is a valve passage 84 through which refrigerant may flow to an outlet chamber 86 connected by a passage 88 to outlet 70 in the fitting 64. Outlet chamber 86 and passage 88 are formed by a throttling valve retainer member 90 which is attached to the upper side of valve seat member 80 by cap screws 92.

The valve seat member 80 encircles the elongated valve actuator 48 which extends through the valve passage 84. A rigid walled, tubular portion 96 of actuator 48 extends through the interior space 54 defined by member 50. An annular throttling valve 98 encircles the tubular portion 96 downstream from the valve passage 84. A valve seat portion 100 on member 80 and surrounding the valve passage 84 is adapted to be operably engaged by the throttling valve 98 to restrict refrigerant flow through the valve passage 84. A bellows-shaped portion 102 having a corrugated and tubular wall member 104 is attached to the upper end of the member 96. An upper end 106 of the bellows portion 102 is secured to a valve retainer 108. The valve retainer 108 is normally pressed downward against an upwardly extending boss 110 formed by the valve seat member 80 by a relatively strong overtravel spring 112.

Figure 2:
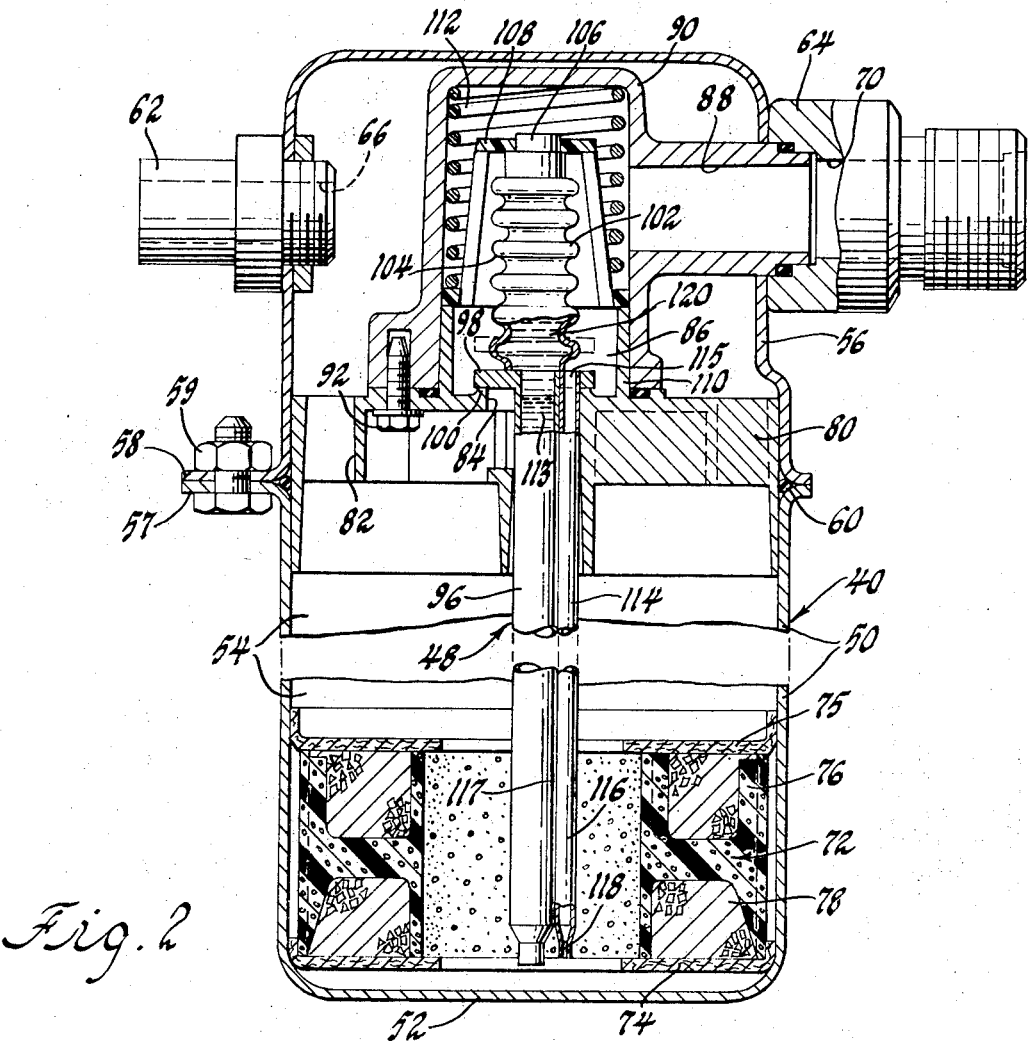
FIG. 2 is a vertical sectioned view of the accumulator shown in FIG. 1 which encloses the present improved throttling valve assembly.

Normally, refrigerant flows through the inlet passage 66 into the interior space 54 of the accumulator where liquid refrigerant settles and is separated from vaporous refrigerant. The vapor then passes through valve passage 84 into outlet chamber 86 and hence through passage 88 to the outlet 70 and then through suction line 42 to the compressor 10. In an open operative position such as operation under high ambient temperature conditions, the throttling valve 98 is positioned a predetermined distance from the valve seat member 100 to permit unrestricted flow of refrigerant from space 54 to the outlet chamber 86. In FIG. 2, the open position of the throttling valve 98 is shown in broken lines.

The tubular portion 96 of the valve actuator 94 is filled with an aqueous fluid 113 having a freezing temperature of 32° F. The upper bellows portion 102 is filled with an immiscible liquid 120 such as oil which is lighter than water and has a freezing temperature substantially below 32° F. The corrugated sidewalls 104 of the bellows 102 permit the bellows to be extended in axial direction which moves the tubular portion 96 and the connected throttling valve 98 with respect to the valve seat 100. Thus, as the temperature of refrigerant within the interior space 54 decreases slightly from 32° F, the ice crystals within the tubular portion 96 grow and the solution expands to pressurize the oil. This causes the bellows to be extended axially and move the throttling valve 98 downward toward the valve seat 100. Once the throttling valve 98 is seated against the valve seat 100 (as shown in FIG. 2), further extension of the bellows portion 102 will only cause upward movement of the retainer 108 against the force of overtravel spring 112. This prevents damage to bellows 102.

Figure 4:
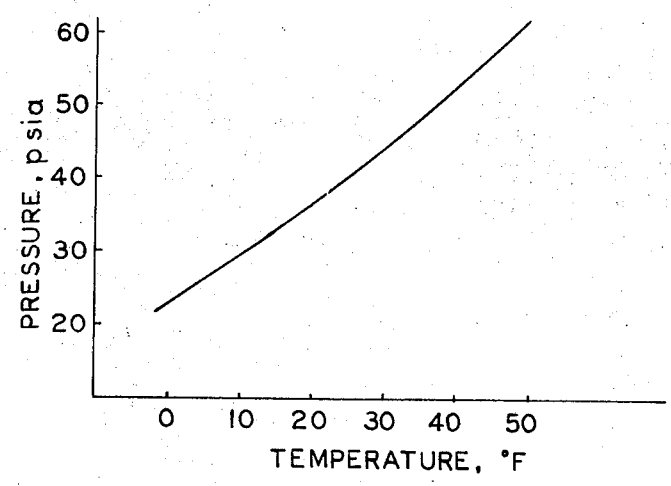
FIG. 4 is a pressure-temperature plot for a commonly used dichlorodifluoromethane refrigerant.

As previously stated, compressor 10 is lubricated by oil which is carried along with the refrigerant through the system. A natural place for oil to collect is the bottom of accumulator 40. Normally, when the valve passage 84 is open, the flow of refrigerant is sufficient to carry oil to the compressor for lubrication. However, when the passage 84 is closed, or near a closed position, sufficient oil may not be carried to the compressor. To provide a continuous flow of oil when valve 98 is closed, a valve bypass means such as an oil pick-up tube 114 is provided. The oil pick-up tube 114 extends through a hole in the throttling valve 98 from an outlet end 115 downstream from the throttling valve 98. The inlet end 116 of the pick-up tube 114 is located near the bottom of space 54. The tube 114 is connected by soldering or other means along a portion of its length 117 near the inlet end 116. A small diameter orifice 118 is formed at the bottom end of the pick-up tube 114. The orifice 118 controls the flow of refrigerant through the oil pick-up tube when the throttling valve 98 is positioned toward a closed position which causes the pressure in the outlet chamber 86 downstream from the throttling valve to be significantly less than the pressure in the space 54. The orifice 118 causes the pressure of refrigerant in the oil pick-up tube to decrease downstream from orifice 118. Thus, the temperature of refrigerant in the oil pick-up tube 114 is also decreased from the temperature of the refrigerant within the accumulator. The pressure temperature relationship of "Freon 12" a commonly used refrigerant can be observed in FIG. 4. It shows that as refrigerant pressure decreases, the temperature of saturated refrigerant also decreases. This pressure gradient between space 54 and outlet chamber 86 provides the motive force which lifts oil and refrigerant through the pick-up tube 114.

Figure 3:
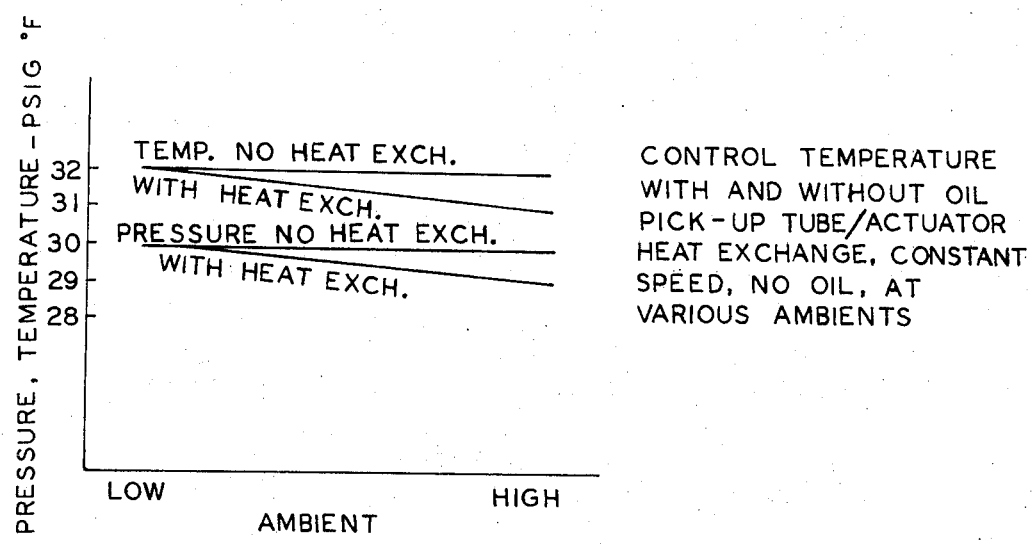
FIG. 3 is a plot of evaporator temperature and pressure versus ambient temperature for an air conditioning system with the present invention.

As previously explained, a temperature gradient between the fluid conveying portions of the tubes 36 of evaporator 34 and the exterior or finned surfaces of the evaporator exists. Consequently, the temperature of refrigerant within the evaporator may be permitted to decrease below 32° F, without causing frost to form on the warmer finned surfaces. The levels to which the refrigerant temperature may decrease below 32° F, of course, is dependent upon the structure of the evaporator itself. The plot shown in FIG. 3 illustrates a desirable temperature and pressure relationship of evaporator refrigerant in a typical automotive air conditioning system. During low ambient temperature operation, frost formation on the evaporator is much more likely because of the reduced heat transfer from air to the evaporator. Therefore, it is important to maintain the temperature of the evaporator at or slightly above 32° F. Under higher ambient temperature operation, the lower evaporator temperatures and pressures shown may be tolerated because the finned surfaces of the evaporator where frost would likely accumulate will still be above 32° F.

The present evaporator temperature controller has a portion 117 of the oil pick-up tube 114 adjacent its inlet end 116 attached in good heat transfer relation to the tubular portion 96 of the valve actuator. When the throttling valve 98 is positioned in a more or less open position (high ambient temperature), there is relatively free flow of refrigerant through the passage 84. Consequently, the refrigerant pressure in space 54 of the accumulator and the outlet chamber 86 are substantially the same, therefore, only small quantities of refrigerant and oil are drawn through orifice 18 into the pick-up tube 114.

When the throttling valve 98 is positioned in a more or less closed restrictive position, the refrigerant pressure within outlet chamber 86 will be significantly less than the refrigerant pressure within space 54 upstream from the throttling valve 98. This causes a considerable flow of refrigerant and oil through the oil pick-up tube 114 at a low-pressure and temperature due to the orifice 118. The reduced temperature of the pick-up tube 114 draws heat from the valve actuator 94 and provides significant heat transfer from the actuator 94 in addition to that provided by the refrigerant in space 54. Since the solution within the tubular portion 96 freeze responds only at about 32° F, the supplemental heat transfer provided by the very cool pick-up tube permits the refrigerant surrounding the actuator in space 54 to have an increased temperature for melting frost or preventing its formation. As previously stated, this is desirable in that at low ambient temperatures a sub-freezing temperature of refrigerant cannot be tolerated without frost formation.

While the embodiment illustrated is a preferred embodiment, other embodiments may be adapted without falling outside the scope of the following claims.

What is claimed is as follows:

1. An evaporator temperature controller for an air conditioning system including a refrigerant compressor and an evaporator in flow relationship with one another comprising: means including a housing defining an interior space and having an inlet connected to the outlet of the evaporator to receive refrigerant therefrom and an outlet connected to the inlet of the compressor for discharging refrigerant thereto from said interior space; wall means having a passage therethrough and a valve seat within said interior space and separating said housing into an outlet portion and an inlet portion; flow control means including a throttling valve movable with respect to said wall means and said passage therein for regulating the flow of refrigerant through said passage from the evaporator to the compressor; a thermally responsive valve actuator operably connected to said throttling valve for positioning it between an open operative position and a closed operative position with respect to said passage in response to changes in the temperature of refrigerant surrounding said actuator; said valve actuator including a rigid walled, tubular portion extending through said inlet housing portion upstream from said throttling valve; the hollow interior of said tubular portion being filled with a material having predetermined thermal expansion properties; an extendable portion of said valve actuator connected to said tubular portion and operably connected to said throttling valve for positioning said valve with respect to said valve seat when said thermally expansive material expands and contracts due to temperature changes; an elongated oil pick-up mounted alongside said tubular portion and having an inlet end located near the bottom of said housing to introduce a mixture of oil and refrigerant therein; said oil pick-up having an outlet end downstream from said throttling valve to discharge oil and refrigerant from the pick-up for passage to the compressor; the inlet of said oil pick-up being restricted by an orifice to produce a lower pressure and temperature of oil and refrigerant within the oil pick-up than that of refrigerant surrounding said tubular portion; whereby the relatively large pressure gradient between upstream and downstream portions of said housing caused by the positioning of said throttling valve near its closed operative position draws a substantial quantity of relatively cold refrigerant and oil through said oil pick-up; said oil pick-up being attached along a portion of its length to said tubular portion of said valve actuator to establish a good heat transfer relation therebetween which provides absorption of heat from said actuator by the oil and refrigerant in said oil pick-up whereby this heat absorption is supplemental to the continuous absorption of heat by refrigerant in said housing and surrounding said tubular portion which resultantly permits the temperature of refrigerant in said housing and said evaporator to increase during periods of operation when the throttling valve is located near its closed operative position to prevent any frost build-up on the evaporator.

2. An evaporator temperature controller for an air conditioning system including a refrigerant compressor and an evaporator in flow relationship with one another comprising: means including a housing defining an interior space and having an inlet connected to the outlet of the evaporator to receive refrigerant therefrom and an outlet connected to the inlet of the compressor for discharging refrigerant thereto from said interior space; wall means having a passage therethrough and a valve seat within said interior space and separating said housing into an outlet portion and an inlet portion; flow control means including a throttling valve movable with respect to said wall means and said passage therein for regulating the flow of refrigerant through said passage from the evaporator to the compressor; a thermally responsive valve actuator operably connected to said throttling valve for positioning it between an open operative position and a closed operative position with respect to said passage in response to changes in the temperature of refrigerant surrounding said actuator; said valve actuator including a rigid walled, tubular portion extending through said inlet housing portion upstream from said throttling valve; the hollow interior of said tubular portion being filled with an aqueous solution having a freezing temperature of about 32° F; an extendable portion of said valve actuator fluidly connected to said tubular portion and operably connected to said throttling valve for positioning said valve with respect to said valve seat when said aqueous solution expands and contracts due to temperature changes; an elongated oil pick-up mounted alongside said tubular portion and having an inlet end located near the bottom of said housing to introduce a mixture of oil and refrigerant therein; said oil pick-up having an outlet end downstream from said throttling valve to discharge oil and refrigerant from the oil pick-up for passage to the compressor; the inlet of said oil pick-up being restricted by an orifice to produce a lower pressure and temperature of oil and refrigerant within the oil pick-up than that of refrigerant surrounding said tubular portion; whereby the relatively large pressure gradient between upstream and downstream portions of said housing caused by the positioning of said throttling valve near its closed operative position draws a substantial quantity of relatively cold refrigerant and oil through said oil pick-up; said oil pick-up being attached along a portion of its length to said tubular portion of said valve actuator to establish a good heat transfer relation therebetween which provides absorption of heat from said actuator by the oil and refrigerant in said oil pick-up whereby this heat absorption is supplemental to the continuous absorption of heat by refrigerant in said housing and surrounding said tubular portion which resultantly permits the temperature of refrigerant in said housing and said evaporator to increase during periods of operation when the throttling valve is located near its closed operative position to prevent any frost build-up on the evaporator.

3. An evaporator temperature control for an air conditioning system including a refrigerant compressor and an evaporator in flow relationship with one another comprising: a liquid accumulator including a housing which defines an interior space which has an inlet connected to the evaporator to receive refrigerant therefrom and an outlet connected to the compressor for discharging refrigerant thereto from said interior space; means including a valve seat member with a valve passage therethrough separating said interior space into an outlet portion and an inlet portion; flow control means including a throttling valve movable with respect to said valve seat member and said passage therein for regulating the flow of refrigerant through said passage from the evaporator to the compressor; a thermally responsive valve actuator operably connected to said throttling valve for positioning it between an open operative position and a closed operative position with respect to said passage in response to changes in the temperature of refrigerant surrounding said actuator; said valve actuator including a rigid walled, tubular portion extending through said inlet housing portion upstream from said throttling valve; the hollow interior of said tubular portion being filled with an aqueous solution having a freezing temperature of about 32° F; an axially extendable portion of said valve actuator fluidly connected to said tubular portion to form an interconnected interior space filled with an immiscible liquid with respect to the aqueous solution; said valve actuator being operably connected to said throttling valve for positioning said valve with respect to said valve seat when said aqueous solution expands and contracts due to temperature changes; an elongated oil pick-up tube mounted alongside said tubular portion and having an inlet end located near the bottom of said inlet portion